April 2, 1968 R. KAPLAN 3,375,904
SPRING MOTOR FOR TOYS OR THE LIKE
Filed Oct. 22, 1965

INVENTOR.
RUTH KAPLAN
BY
ATTORNEY

United States Patent Office 3,375,904
Patented Apr. 2, 1968

3,375,904
SPRING MOTOR FOR TOYS OR THE LIKE
Ruth Kaplan, 230—41 131st Ave.,
Laurelton, N.Y. 11413
Filed Oct. 22, 1965, Ser. No. 501,736
11 Claims. (Cl. 185—39)

ABSTRACT OF THE DISCLOSURE

A spring motor, in which a pair of spaced wheel-supporting shafts are journaled in spaced frame members, one of said shafts forming a winding shaft for a coil spring to one end of which it is connected; said winding shaft having a sleeve fitted rotatably over one end thereof, said sleeve journaled in one of said frame members and mounting one of said wheels, said winding shaft projecting from said sleeve exteriorly of said frame; a gear train actuated by said winding shaft arranged to rotate said other shaft and said sleeve; a balance wheel on said other shaft and braking means applicable to said balance wheel for inhibiting the unwinding of the spring.

---

The present invention relates to a key-wound spring motor and, more particularly, to a key-wound spring motor particularly adapted for use with motion toys and especially for toy vehicles. It is an object of the present invention to provide a spring motor which may be made in one size and be suitable for use with toys, particularly vehicles of different size, to thereby make possible the practice of economies in money, time and space, in the production of the motors and of the toys or the like with which they are assembled.

It is another object of the present invention to provide spring motors, of the character described, which has simplified and reduced gearing, to thereby render them of lighter weight and affording further economies in production and use.

It is a further object of the present invention to provide spring motors, of the character described, having a novel braking mechanism, which is not only highly effective for its purpose, but simulates the appearance and action of a hand brake of real vehicles.

The foregoing and other objects and advantages of the key-wound spring motor of the present invention will become more readily apparent to those skilled in the art from the embodiment thereof shown in the accompanying drawing, and from the description following. It is to be understood, however, that such embodiment is shown by way of illustration only, to make the principles and practice of the invention more readily comprehensible and without any intent of limiting the invention to the specific details therein shown.

In the drawings

Figure 1:
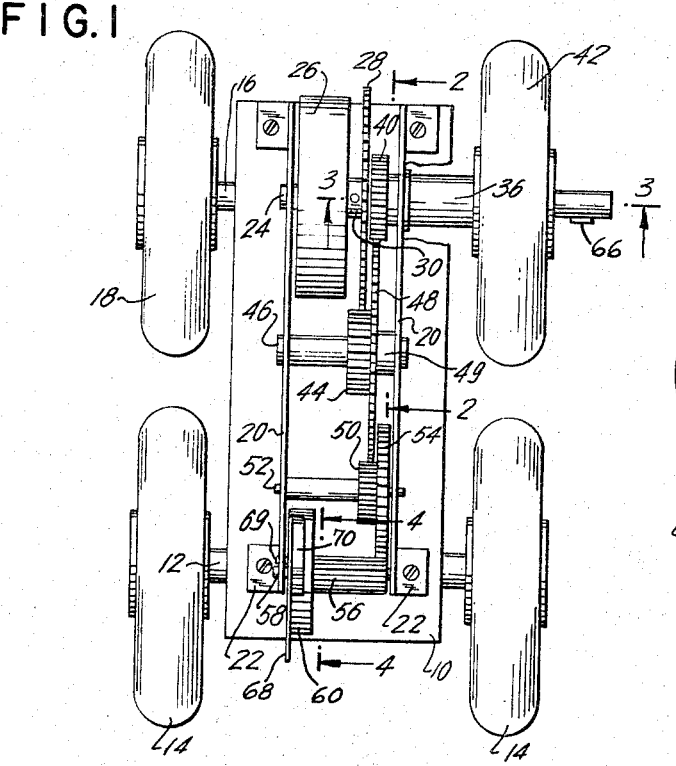
FIG. 1 is a top plan view of a motor of the present invention, shown as comprising part of the chassis of a vehicle.
Figure 2:
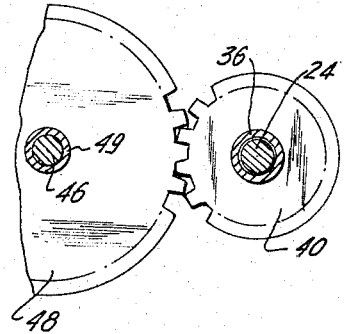
FIG. 2 is a section taken on line 2—2 of FIG. 1.
Figure 3:
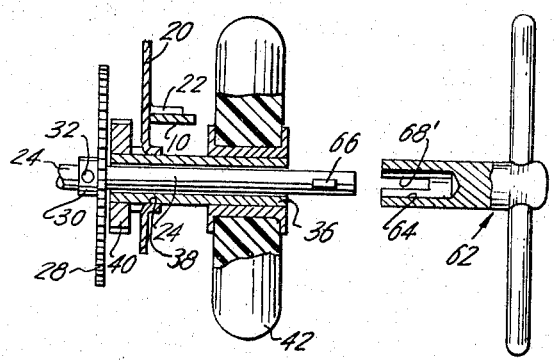
FIG. 3 is a view taken on line 3—3 of FIG. 1, shown with a winding key in position for use thereon.

Referring now, in greater detail, to the embodiment of the invention illustrated in the drawing, the same shows a vehicle having a chassis, generally designated as 10 on which are supported an axle 12 at one end, mounting idling wheels 14 and another axle 16 at its other end, mounting one idling wheel 18. The chassis 10 also supports a spring motor structure which includes spaced upright parallel frame walls 20 that are secured by their feet 22 on the chassis 10. Journaled in walls 20 is a winding and driving shaft 24, whose one end projects beyond the chassis 10. The driving shaft 24 mounts a motor spring 26 intermediate the frame walls 20 and adjacent one of them. The motor spring 26 may have one end secured to the driving shaft 24 and another end fixedly secured to the frame 10, in the conventional manner, not thought necessary to be specifically illustrated.

Also mounted on the winding and driving shaft 24 between spring 26 and the other of the walls 20 is a relatively large driving gear wheel 28, which is fixedly secured in place on the driving shaft as by the integral collar 30 and the set screw or pin 32, which is engaged in a suitable opening in the collar 30. Rotatably mounted over driving shaft 24, on the other side of the gear wheel 28 from the spring 26, is a sleeve 36, which is journaled in the opening 38 of the adjacent wall 20. The sleeve carries, on the end thereof within the frame 10, a pinion 40, and extends outwardly of the frame a distance past the chassis 10 but terminates short of the end of the driving shaft 24 and has secured, on its outer end, a driven wheel 42.

Gear wheel 28 engages a pinion 44, mounted on shaft 46, journaled in walls 20. Shaft 46 also mounts a gear wheel 48, which may be integral with pinion 44, if desired, or secured by collar 49. Gear wheel 48 engages pinion 40 on sleeve 36, as well as a pinion 50, mounted on shaft 52, journaled in walls 20. Shaft 52 also carries a gear wheel 54 that engages the pinion 56 mounted on shaft 58 that is journaled between walls 20 and also carries the speed-regulating counter-weight wheel 60.

Driving shaft 24 may have its projecting end provided with means for being operatively engaged by a winding key, generally designated as 62. Such means may comprise either a polygonal shaped end on the shaft 24 that may correspond to the shape of the recess 64 of the winding key 62, or it may be in the form of a key projection 66 on the projecting end of shaft 24 that may engage in a keyway slot 68' formed in the wall of the recess 64 of winding key 62.

The operation of the spring motor of the present invention will now be clear. The motor may be wound in the conventional manner by the turning of the key 62 fitted over the projecting end of the shaft 24. This will be effected without rotation of the sleeve 36 nor the driven vehicle moving wheel 42 secured thereon. When the driving shaft 24 is released from key 62, the unwinding of the spring 26 will rotate driving shaft 24 without directly affecting sleeve 36 or driven wheel 42. The rotation of shaft 24 will rotate gear wheel 28 mounted thereon, which will, in turn, rotate pinion 44 and the shaft 46 on which it is mounted. In turn, gear wheel 48 will be rotated to rotate pinion 40 mounted on sleeve 36 to cause the latter, and the driven wheel 42 mounted thereon, to rotate and thereby move the vehicle on a supporting surface. Gear wheel 48 will also rotate pinion 50 which it engages, and, with it, gear 54 which will, in turn, rotate pinion 56 mounted on shaft 58 and the counter-balance wheel 60 comounted with it, thereby regulating the unwinding of the spring 26, to slow it, in the conventional and well-understood manner.

It may here be stated that, if desired, pinion 40 may be mounted on sleeve 36 exteriorly of the adjacent wall 20 and likewise gear wheel 48, which drives it, may be mounted exteriorly of the adjacent wall 20 on a suitable extension of shaft 46. It may here also be stated that, if desired, the counter-balance wheel 60 may likewise be mounted exteriorly of the adjacent wall 20.

Figure 4:
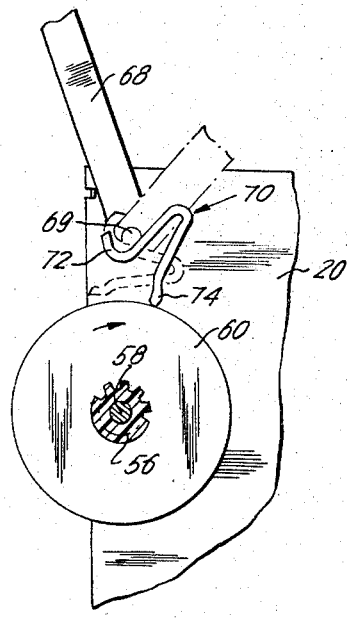
FIG. 4 is a section taken on line 4—4 of FIG. 1.

While any suitable motor-braking means may be provided for the motor described above, I prefer to use a brake applied to the circumference of the counter-balance wheel 60. Such brake may comprise the arm 68 pivoted on wall 20, as at 69, in proximity to counter-balance wheel 60 and slightly spaced therefrom. The handle end of the arm 68 may project above the motor frame 10, and its other end, closest to the counter-balance wheel 60, may support a V-shaped spring, generally designated as 70, by the end of one of its arms, as at 72, in position to have the end 74 of its other arm frictionally engage the circumference of the counter-balance wheel 60 to stop its rotation, when the arm 68 is in one position, as in upright position, and to be disengaged from such circumference when the arm 68 is moved away from its first position, as toward horizontal position, as illustrated in FIG. 4 of the drawings.

This completes the description of the key-wound spring motor of the present invention. It will be readily apparent that a single size of the motor of the present invention may be utilized with vehicles having wheels of different diameter and spaced apart different distances from one another, without the need for modifying the size of the motor or the size and arrangement of its gears. It will also be apparent that the spring motor of the present invention utilizes a gear train having a minimum number of gears and pinions. It will likewise be apparent that the spring motor of the present invention may be readily and easily braked to a stop by means that are highly effective for the purpose and that closely simulate the hand brake of a real motor vehicle.

It will be further apparent that numerous variations and modifications may be made in the key-wound spring motor of the present invention by anyone skilled in the art, in accordance with the principles of the invention hereinabove set forth, without the exercise of any inventive ingenuity. I desire, therefore, to be protected for any and all such variations and modifications that may be made within the spirit of the invention and scope of the claims hereto appended.

What I claim is:

1. A spring motor for a toy, or the like, comprising a frame, including spaced walls, a winding shaft rotatably supported for winding on one of said walls, a cylindrical sleeve rotatably supported on the other of said walls in axial alinement with said winding shaft, said sleeve projecting to each side of said other wall and having its inner portion extend partly into the spaces between said walls and its outer end portion projecting outwardly from said other wall, said winding shaft extending through said sleeve and rotatable therein and projecting from the outer end thereof, a coiled motor spring mounted over said winding shaft and connected thereto, a gear mounted on said winding shaft, a gear mounted on said sleeve, a second shaft rotatably supported in said walls, in parallel relation to said winding shaft, said second shaft having a pair of gears mounted thereon, one of said gears meshing with said winding shaft gear and the other of said gears meshing with said sleeve gear, and a driven member mounted on the outer end of said sleeve, and means on the projecting end of said winding shaft engageable for rotating the same.

2. The spring motor of claim 1, wherein said engageable means on said winding shaft are engageable by a winding key.

3. The spring motor of claim 1, wherein said sleeve gear and said one gear comprise pinions of lesser diameter than said winding shaft gear and said other gear.

4. The spring motor of claim 1, wherein all said gears are disposed within said frame between said walls.

5. The spring motor of claim 1, wherein motor speed regulating means are provided, said regulating means comprising a third shaft rotatably supported on said frame, in parallel relation to said winding shaft, said third shaft having a regulating member and a gear mounted thereon, said gear meshing with said one gear.

6. The spring motor of claim 5, wherein said gear regulating member comprises a counter-balance wheel.

7. The spring motor of claim 6, wherein manually operable means are mounted on said frame frictionally engageable against said wheel for braking said spring motor.

8. The spring motor of claim 7, wherein said braking means comprises an arm pivotally supported on a wall of said frame, one end of said arm having a spring element secured thereto, said arm and said spring element arranged to have said spring element frictionally engage the periphery of said wheel in one position of said arm and release said periphery of said wheel in another position thereof.

9. The spring motor of claim 8, wherein said spring element is of substantially V-shape and is secured by the end of one side thereof to said arm end with its opening facing the direction of rotation, said arm and said spring arranged to have the end of the other side of said spring frictionally engage the periphery of said wheel forwardly of the axis of rotation thereof.

10. In a spring motor, including a frame wall and speed regulating means comprising a counter-balance wheel and a shaft rotatably supported on said wall mounting said wheel, means for braking said wheel comprising an arm pivotally supported on said wall and a spring element mounted on one end of said arm, said arm and said spring arranged to have said spring frictionally engage the periphery of said wheel in one position of said arm and to release said periphery in another position thereof.

11. The spring motor of claim 10, wherein said spring is of V-shape and is connected to said arm by one end of a side thereof with the end of its other side engageable against the periphery of said wheel.

References Cited

UNITED STATES PATENTS

| 920,120 | 5/1909 | Elton | 185—39 |
| 2,536,395 | 1/1951 | Saunders | 185—37 X |
| 2,710,674 | 6/1955 | Duncan | 185—37 |

EDGAR W. GEOGHEGAN, *Primary Examiner.*